United States Patent
Kohler

(10) Patent No.: US 7,505,818 B1
(45) Date of Patent: Mar. 17, 2009

(54) CONVERTER METHOD, SYSTEM AND APPARATUS

(75) Inventor: Raymond Kohler, Souderton, PA (US)

(73) Assignee: Siemens Energy & Automation, Inc., Alpharetta, GA (US)

(*) Notice: Subject to any disclaimer, the term of this patent is extended or adjusted under 35 U.S.C. 154(b) by 690 days.

(21) Appl. No.: 10/237,425

(22) Filed: Sep. 9, 2002

Related U.S. Application Data

(60) Provisional application No. 60/317,838, filed on Sep. 7, 2001.

(51) Int. Cl.
| | |
|---|---|
| G05B 11/01 | (2006.01) |
| G05D 11/00 | (2006.01) |
| G05D 7/00 | (2006.01) |
| G05D 3/12 | (2006.01) |
| G05D 16/06 | (2006.01) |
| F17D 1/16 | (2006.01) |
| F16K 31/12 | (2006.01) |

(52) U.S. Cl. .................. 700/19; 700/282; 700/289; 137/14; 137/102; 137/487.5; 137/613

(58) Field of Classification Search ............... 137/82, 137/85, 116.5, 487.5, 492.5, 613, 14, 102; 700/275, 281–282, 289, 19
See application file for complete search history.

(56) References Cited

U.S. PATENT DOCUMENTS

| | | | | |
|---|---|---|---|---|
| 4,253,480 | A * | 3/1981 | Kessel et al. | 137/102 |
| 4,481,967 | A * | 11/1984 | Frick | 137/85 |
| 4,630,632 | A * | 12/1986 | Johnson | 137/85 |
| 4,951,705 | A * | 8/1990 | Carey et al. | 137/487.5 |
| 5,094,260 | A * | 3/1992 | Stuart et al. | 137/102 |
| 5,370,152 | A * | 12/1994 | Carey et al. | 137/487.5 |
| 5,699,824 | A * | 12/1997 | Kemmler et al. | 137/85 |
| 5,887,430 | A * | 3/1999 | Hirai et al. | 60/433 |
| 6,003,543 | A * | 12/1999 | Sulatisky et al. | 137/487.5 |
| 6,178,997 | B1 * | 1/2001 | Adams et al. | 137/487.5 |
| 6,305,401 | B1 * | 10/2001 | Uehara et al. | 137/102 |
| 6,308,725 | B1 * | 10/2001 | Lawlyes et al. | 137/14 |
| 6,705,199 | B2 * | 3/2004 | Liao et al. | 91/363 R |
| 6,758,233 | B2 * | 7/2004 | Sulatisky et al. | 137/14 |
| 6,772,784 | B1 * | 8/2004 | Jones et al. | 137/102 |
| 2003/0056641 | A1 * | 3/2003 | Liao et al. | 91/361 |
| 2003/0168101 | A1 * | 9/2003 | Sulatisky et al. | 137/487.5 |
| 2003/0208305 | A1 * | 11/2003 | Junk et al. | 700/282 |
| 2004/0011411 | A1 * | 1/2004 | Thordarson et al. | 137/613 |

FOREIGN PATENT DOCUMENTS

WO    WO 01/59537 A1 *   8/2001

* cited by examiner

*Primary Examiner*—Ronald D Hartman, Jr.

(57) ABSTRACT

An x to pressure converter that uses valves oscillating between open and closed positions in a pulse width modulated mode, to force the output pressure to equal the input X.

14 Claims, 6 Drawing Sheets

CONVERTER METHOD, SYSTEM AND APPARATUS

This application claims the benefit, for purposes of priority under 35 U.S.C. § 119(e), of U.S. Provisional Patent Application No. 60/317,838 filed Sep. 7, 2001.

BACKGROUND

1. Field of the Invention

The present invention relates to a novel converter and, more particularly, to a system incorporating a current to pressure (I/P) converter to control a valve using pressure as a control signal.

2. Related Information

It is desired in the art of automation to control fluid flow in an automation system by actuation of a valve. The typical control device is a valve positioner.

The typical system 100 is shown in FIG. 1, causes an actuator to actuate a valve 104. The control mechanism, a valve positioner 106, inputs a current signal 108 and outputs a pressure to control the actuator. Typically, 4-20 mA input signal is input to the valve positioner.

Notably, the system in FIG. 1 controls the valve by reading the position of the valve and adjusting the output pressure until the position matches the input signal. The position of the valve is sensed typically by a physical connection to the actuator.

Many valve positioners in the market require that their input signals be pressure. Therefore, there is a great need to develop a system, where pressure is the controlled parameter, not valve position.

OBJECTS & SUMMARY OF THE INVENTION

It is an object of the invention to provide a converter for converting an input signal into an output pressure According to the foregoing objective, there is provided an x to pressure P converter that inputs a value x and comprises a valve system to control pressure P based on input value x such that the valve system has discrete open and closed positions, wherein no significant pressure variation is sensed in switching between positions.

While the x to P converter includes a valve system, it should be understood that this valve system is different than the valve which is controlled for, for example, controlling the flow of fluid in an automation system.

DETAILED DESCRIPTION OF THE PREFERRED EMBODIMENTS

Figure 1:
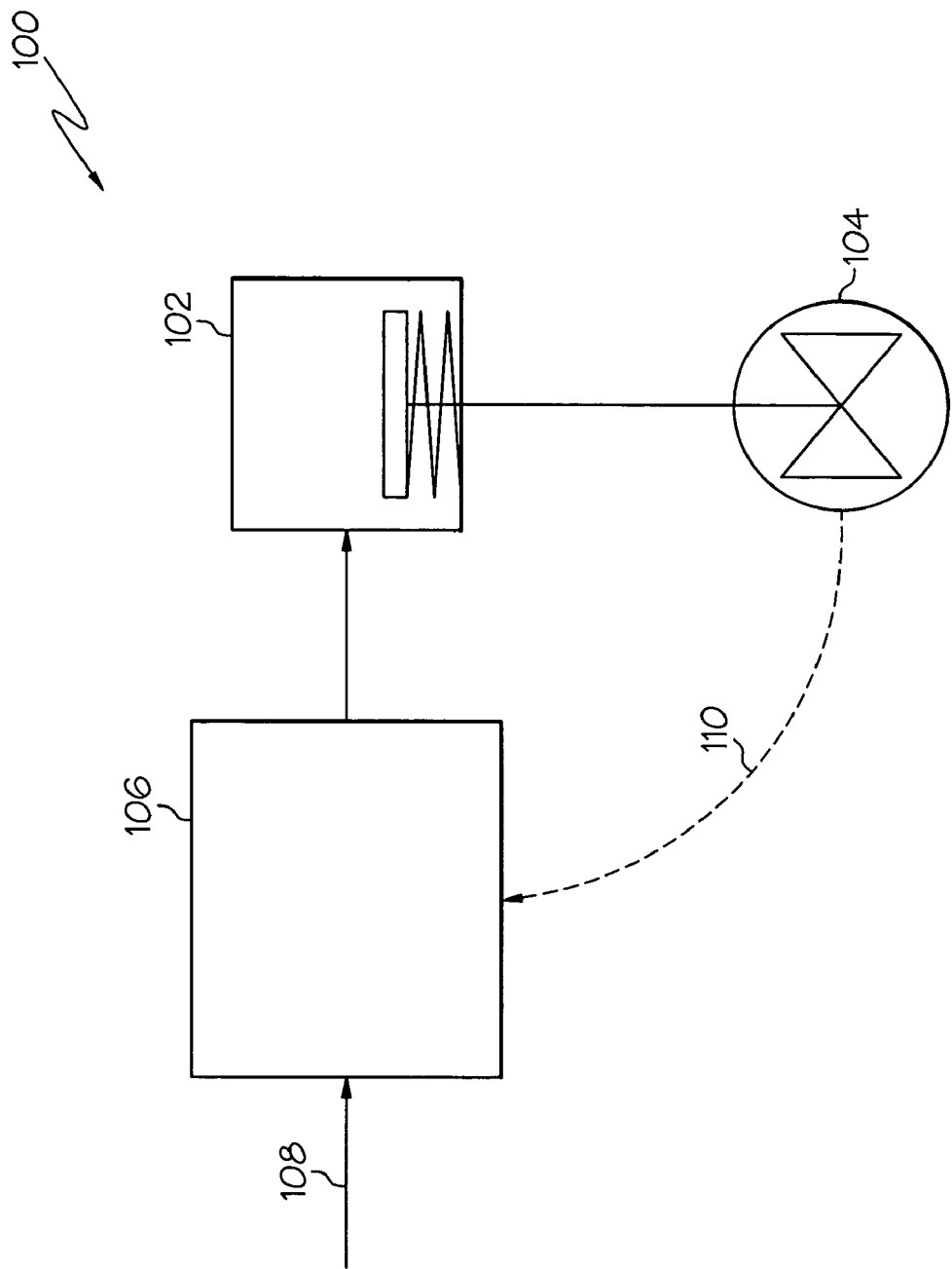
FIG. 1 is a schematic diagram of a prior system.
Figure 2:
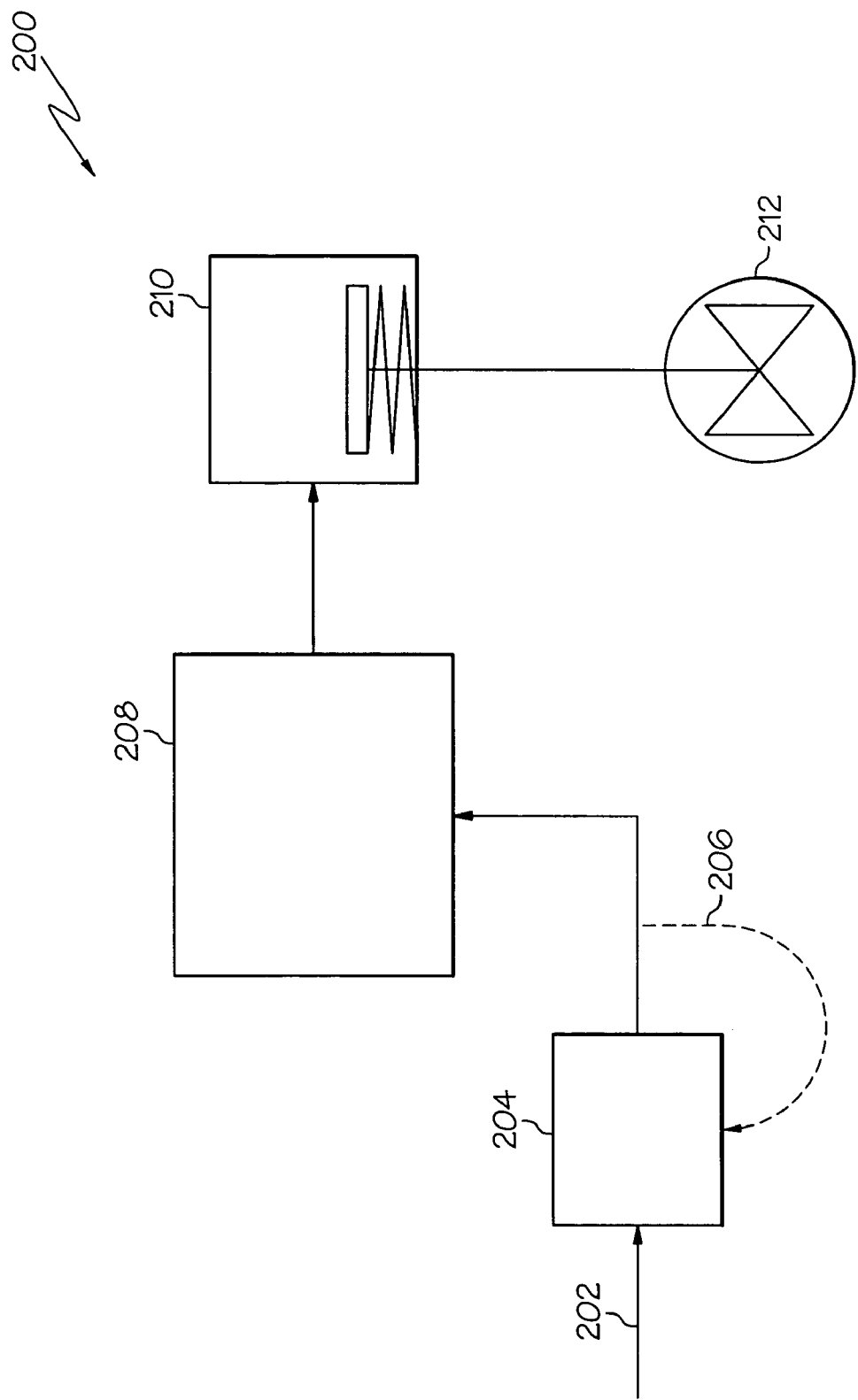
FIG. 2 is a schematic diagram of the present invention.

There is shown in FIG. 2 the novel system 200 of the invention. As shown, an input current 202 is input to an I/P converter 204. A pressure (P) is utilized as a feedback signal 206 which is fed back to the I/P converter. The pressure is coupled to a valve positioner 208 to control the position of the actuator 210, which, in turn, actuates the position of the valve 212.

It shall be appreciated that the present invention, unlike the prior systems, utilizes pressure as the control signal. By contrast, the prior systems utilize a mechanical or electronic signal representative of the position of the valve.

In order to generate the control pressure, the present invention converts an input current into a pressure. Notably, the system utilizes the pressure output as a feedback, as contrasted with other systems, which use an electric signal as feedback.

The difference is not trivial. As indicated, many valve positioners receive a pressure input. Thus, the present invention represents a serious advantage that it has more flexibility in the marketplace to, for example, work with both existing and future positioner systems.

A system that utilizes pressure as the control signal, maintaining a high quality output, is a real challenge. As will be explained in more detail, the present invention does this by employing a pulse-width modulation technique to discretely position a valve system in an open and closed state. Unlike throttling, which maintains the valve in a state in between open and closed, the present invention ensures that no significant pressure variation is sensed between the discrete open and closed positions.

An advantage of this arrangement is that it reduces the effects of vibration, which are negated by the discrete open and closed positions. In a throttling type system, by contrast, vibration effects have a significant impact on valves that are maintained in an in between state because the valves are not fixedly closed or open.

Figure 3:
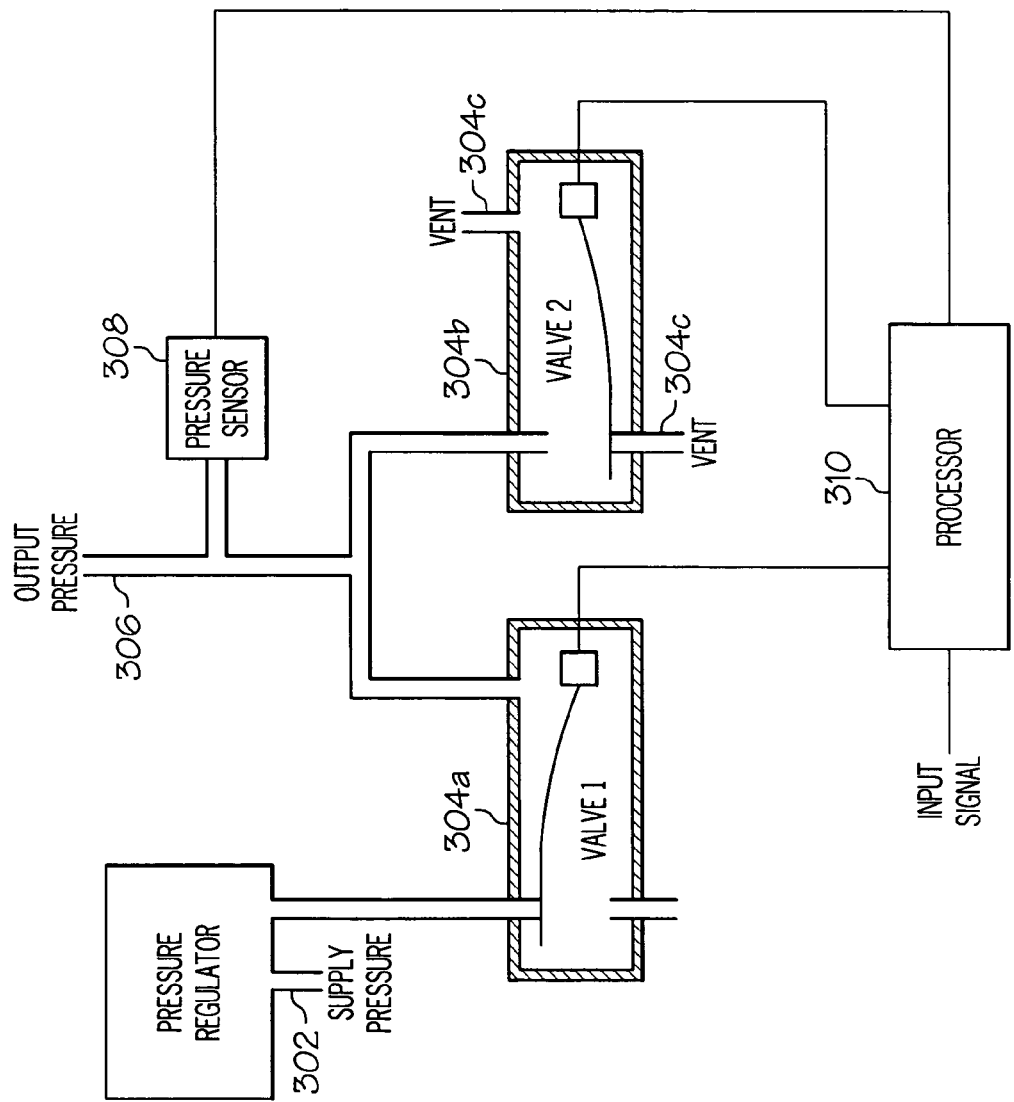
FIG. 3 is a schematic diagram of the valve system present invention.

Now with respect to FIG. 3, there is shown the I-P converter 300 of the present invention. A pressure regulator 302 provides a regulated supply pressure to a valve system 304. The valve system is arranged in a relationship such that the pressure output is maintained at the desired level. This is done, such that the valve system is either in a discrete open or closed state such that no significant variation of pressure is sensed between the states.

In the particular embodiment shown in FIG. 3, there is show, for example, a dual-valve system. Of course, the valve system may have any number of valves, and may even be singular, as long as the system is capable of satisfying the condition that the valves are positioned in discrete open and closed states. To continue, the dual-valve system includes a first valve 304a and a second valve 304b, wherein the first valve receives supply pressure from the pressure regulator and the second valve exhausts the pressure through vent 304c. A common passage connects the valves 304 a, b to provide for the relationship of discrete open and closed states. The pressure is output at 306 and sensed by a pressure sensor 308. A microprocessor 310 controls the valve system.

As mentioned the prior converters utilized a pressure valve that throttled, that is, varied the size of a pressure opening, to control pressure input. In other words, the old method always held the pressure valve open to a certain degree. The old pressure valve was never fully closed or fully open at any time. In the present invention, there is provided a novel valve arrangement for an I/P that forces the primary valve to discrete, fully open and fully closed positions. The secondary valve relieves pressure from the primary and allows, indeed assists, in changing the valves system between discrete states.

The invention of forcing the primary valve into the fully open or fully closed position is advantageous. The previous throttling method was subject to error arising from external vibration effects. Due to the fact that the prior valve was not in the extended position, the old valve concept was based on situating the opening to precise degrees. Obviously, external vibration translated to the valve and effected the opening of the old valve, thereby making it difficult, and introducing substantial error, to the resultant measured pressure in the previous method.

By contrast, the present invention alleviates the effect of vibration by ensuring that the primary valve is in a discrete open or closed state. This alleviates the vibration effect because the valve is physically supported by the structure of the valve. When the valve is fully closed for example, the leaf or diaphragm responsible for regulating pressure through the valve is biased against the structure of the valve itself. There is, thus, no possibility that vibration plays an effect on the valve.

Similarly, in the dual-valve system, when the first valve of the present invention is fully open, vibration has no chance to effect the valve opening status. In addition, the second valve relieves pressure in order to open the primary. In combination with the action of the primary, the dual valves act together to force the first valve leaf into the extended positions, thereby increasing the strength of the opening and closing of the valve and, further, reducing the effect of vibration.

In addition, another novel feature of the present invention is that it employs a pressure feedback system to boost the reliability of the pressure converted. Particularly in an input device such as the I/P converter, it is important that the input pressure created by the invention matches as precisely as possible the pressure indicated by the input current. This is not as critical in the prior technique, because the pressure produced is not the input pressure, but is the pressure that drives the actuator. The present invention creates an input pressure. Therefore, the pressure must be more accurate than ever before. As mentioned, the present invention employs the pressure as the feedback signal.

The microprocessor may also control the valve system to include dither. By controlling the timing of the supply and exhaust valves, small high frequency pressure variations can be created. These variations will not upset the state of the output system, but they introduce a margin of movement that reduces the error in mechanical systems due to inertial effects of causing a stationary object, to move. This mechanical error may take several forms such as dead band, the delay in moving the valve system toward the other state due to inertia. Also, backlash may occur, which is a violent change from one state to the other. Hysteresis may form, which is a difference in performance between one change of direction in comparison to the other. Also, static friction may occur, which is the sticking of the tendency of the valve to stick in one state.

In addition, the valve system may improve efficiency as follows. The valves appear electronically as capacitors. Most prior systems simply reverse the polarity of the valve. This prior practice is horribly inefficient because current is required to first reverse bias the valve and additional, requiring additional power, even before the valve can be switched. In the prior systems, this was normal because power was not a consideration. However, in the applications in which the present invention may be applied, power conservation would translate into a market advantage.

In the present invention, the microprocessor may drive the valve by pre-discharging the valve by shorting the effective terminals of the capacitor and the valve itself dissipates the excess current through the short circuit. In this manner, the system reduces the power consumption, allows a higher switching rate and reduces dead time. In addition, the system effectively decreases the size of the power supply, thereby reducing the cost of the system.

Figure 4:
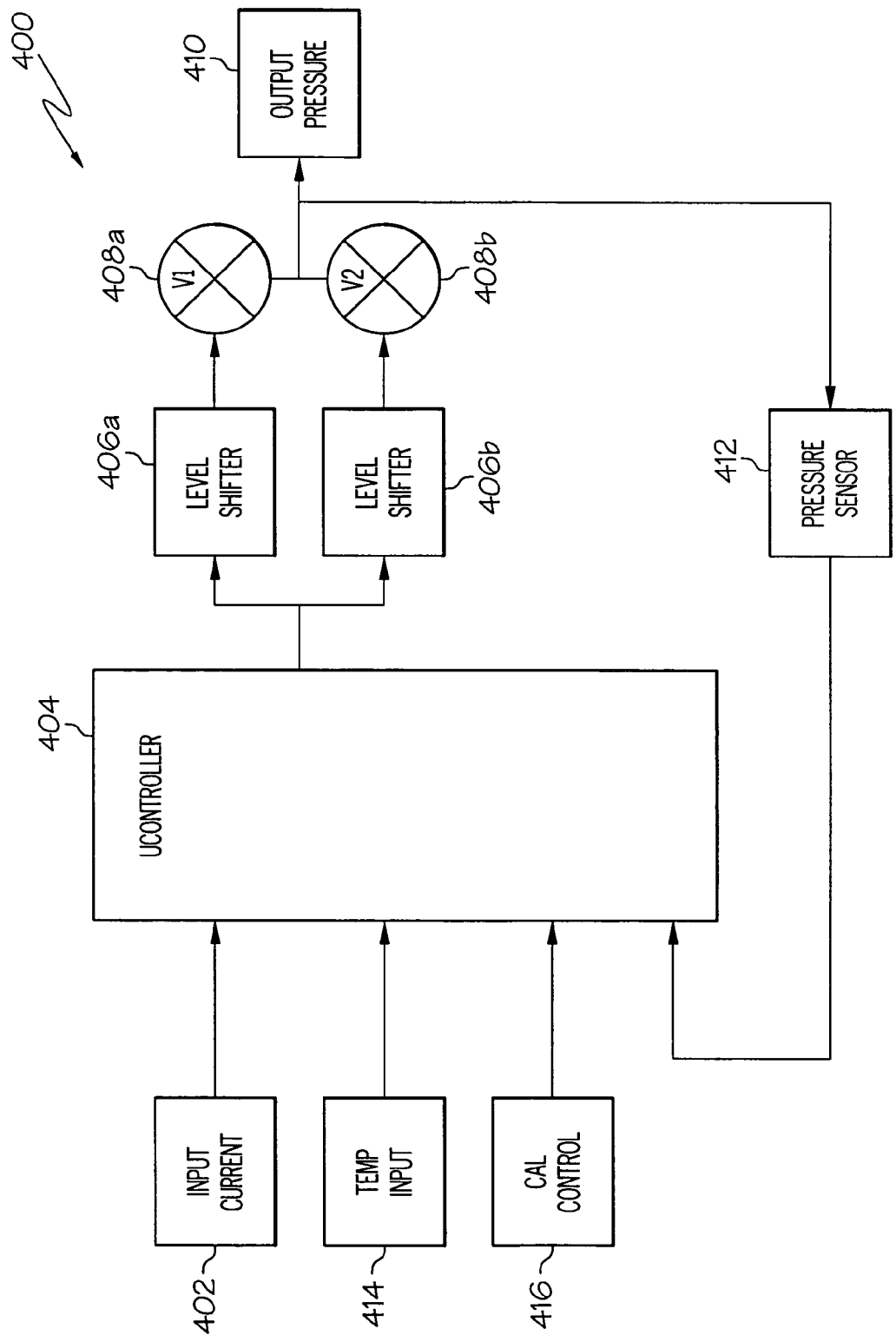
FIG. 4 is a block diagram of the valve system.

FIG. 4 illustrates a block diagram of the system 300 (400) shown in FIG. 3. As shown, the input current 402 is input to the microprocessor 404. The microprocessor generates a control signal thereon. Level shifters 406a, 406b may be provided to provide the correct signal level to the valves 408a and 408b which control the pressure as previously described. An output pressure 410 is sensed by a pressure sensor 412 and fed back to the microprocessor. A temperature input 414 which inputs a temperature and a calibration control input 416 may be provided to the microprocessor for adjusting the microprocessor signals according to the temperature or the calibration, respectively.

Figure 5:
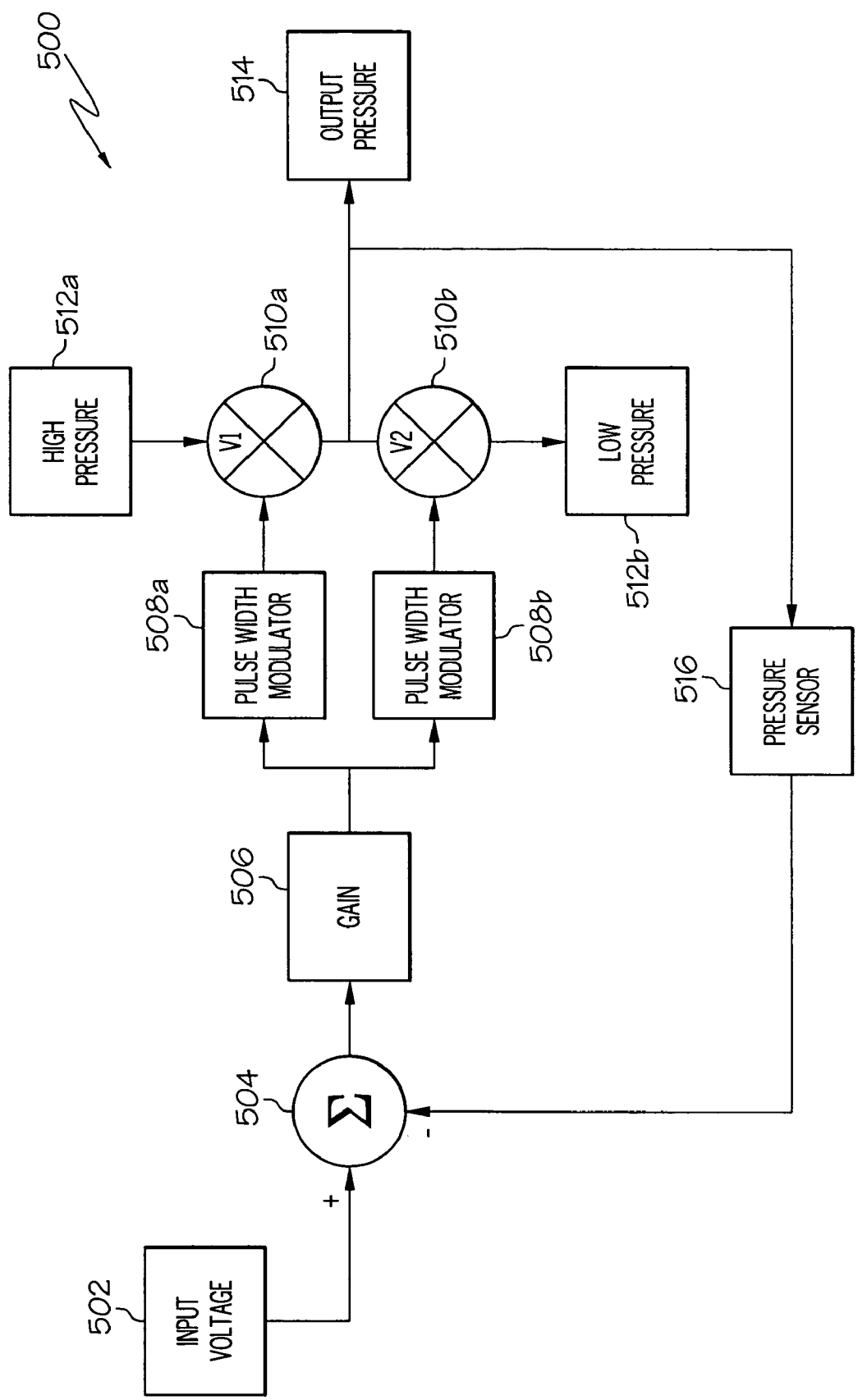
FIG. 5 is a block diagram of the control system.

FIG. 5 illustrates a block diagram of the control system 500 of the invention. There is shown an input voltage 502 that is supplied to the summer. A gain 506 inputs the result of the summer and outputs the gain to the pulse width modulators 508a and 508b, respectively. Valves 510a and 510b receive the pulsed signals, which respectively receive high pressure 512a and low pressure 512b. The output pressure 514 is sensed by pressure sensor 516 and subtracted by the negative terminal of summer 504 to provide the feedback to the system.

Figure 6:
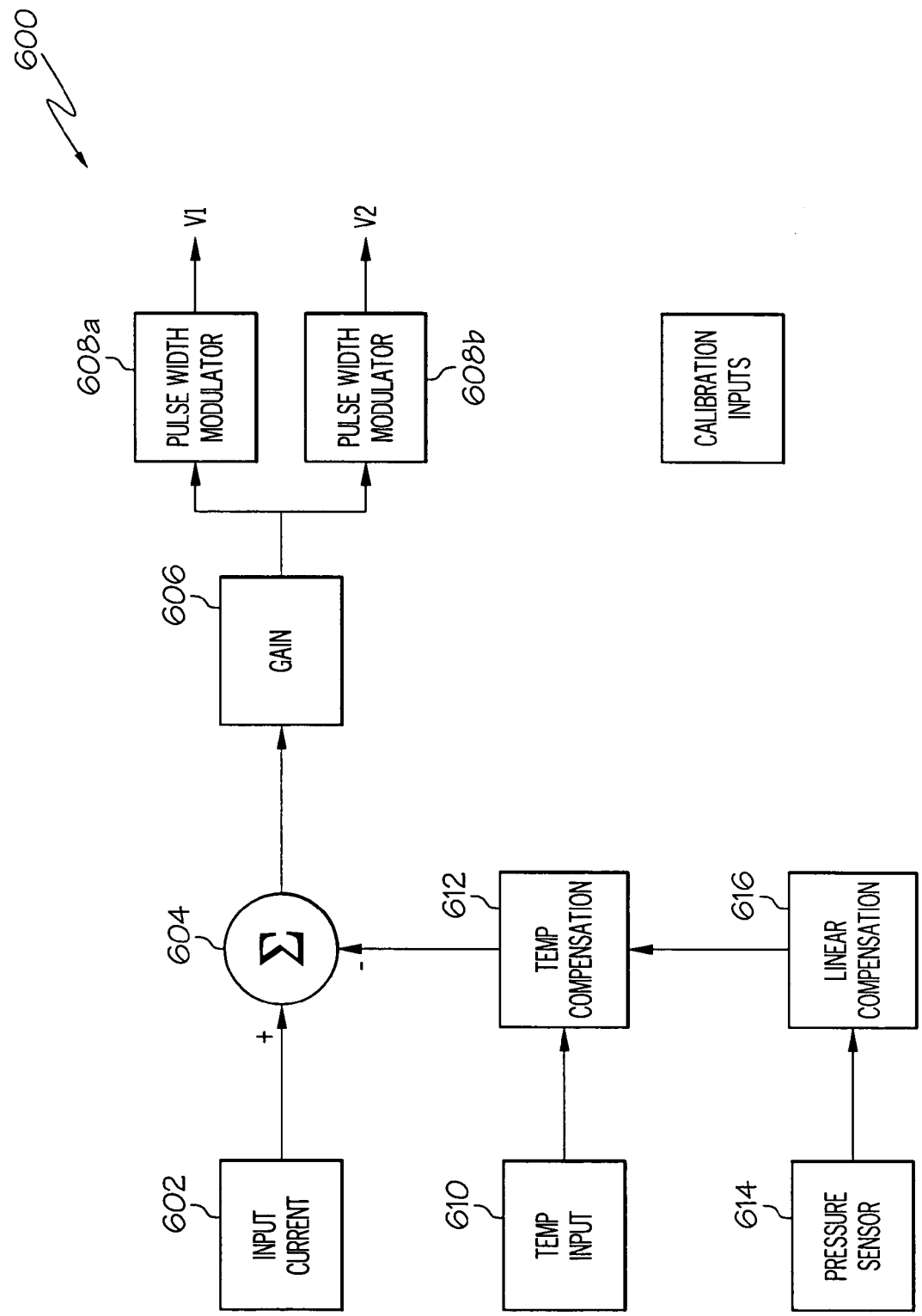
FIG. 6 is a block diagram of the processor control.

FIG. 6 illustrates a block diagram for a software application 600 An input current 602 is input to a summer 604. Based on the output from the summer, a gain 606 controls the gain of a control signal that is sent to the pulse width modulators 608a, b. A temperature input 610 inputs the temperature to a temperature controller 612 and a pressure sensor 614 inputs the pressure sensed, via a linear compensation unit 616. The temperature and/or pressure are input to the negative terminal of the summer 604 which adjusts the result sent to the gain accordingly.

It shall be appreciated that the invention encompasses any number of embodiments that meet the objective of the invention so described. Although the invention has been described as a dual-valve, for example, it is within the scope of the invention to provide any number of valves in the system.

I claim:

1. An automatic control system for converting an input x to a pressure P, the system comprising:
  an input for inputting an input signal representing a value x, wherein the input signal is a current;
  a first valve including a movable element responsible for regulating pressure, wherein the movable element is operable to be moved only between fully open and fully closed positions wherein the movable element is biased against and physically supported by a structure in the first valve and is not throttled to a partially open positions, such that no substantial pressure variation is sensed in switching between the positions, and wherein the movable element comprises at least one of a valve leaf and valve diaphragm responsible for regulating pressure through the first valve;
  a second valve in fluid communication with the first valve and configured to relieve pressure in order to open the first valve by venting fluid through a vent port that is not connected to an output of a pressure regulator;
  a pressure sensor configured to sense output pressure P of the first valve;
  a valve controller configured to control the output pressure P provided by the first valve based on the input signal and the output pressure P by moving the first valve only between the two positions without throttling the first valve to intermediate positions, wherein no substantial pressure variation is sensed in switching between positions; and a controlled valve of an automation device configured to control fluid flow, wherein the controlled valve is controlled according to the output pressure P provided by the first valve.

2. The system of claim 1, wherein the controller comprises a processor for controlling the first valve.

3. The system of claim 1, wherein the controller comprises a pulse width modulator for modulating the first valve.

4. The system of claim 1, further comprising an actuator that actuates the controlled valve for controlling fluid flow.

5. The system of claim 4, further comprising a valve positioner that controls the actuator according to the control pressure P output by the first valve.

6. An automatic control method of controlling an output pressure P based on a-pressure value x, comprising:
inputting an input signal representing a pressure value x; and
controlling an output pressure P from a valve system by positioning the valve system based on the input signal and based on a feedback signal representing the output pressure P by moving a first valve of the valve system only between fully open and fully closed positions where the first valve of the valve system is biased against and physically supported by a structure in the valve system and is not throttled to a partially open position, and moving a second valve in fluid communication with the first valve to relieve pressure based on the output pressure P to assist in opening and closing the first valve, such that no substantial pressure variation is sensed in switching between positions.

7. The method of claim 6, wherein the input signal is a current.

8. The method of claim 6, further comprising generating pulse signals from the input signal to control the valve system.

9. The method of claim 6, further comprising controlling a valve according to the output pressure P so as to regulate fluid flow in an automation system.

10. The method of claim 9, further comprising controlling a valve positioner using the output pressure P that controls the valve.

11. The method of claim 10, further comprising actuating an actuator based on a signal generated by the valve positioner in accordance with the output pressure P.

12. An automatic control system, the system comprising:
a fluid source;
a primary valve in fluid communication with the fluid source and configured to provide output fluid at an output pressure by moving between a fully closed position and a fully open position;
a secondary valve in fluid communication with the primary valve and configured to vent fluid through a vent port;
a pressure sensor configured to sense the output pressure provided by the primary valve;
a processor configured to control the output pressure provided by the primary valve in response to an input signal and the output pressure sensed by the pressure sensor, wherein the processor controls the output pressure by controlling the position of the secondary valve and by causing movement of the primary valve between only two positions, wherein the positions comprise a fully open position and a fully closed position where no significant pressure variation is sensed in switching between positions; and
a controlled valve in an automation device wherein the controlled valve is configured to be controlled by the output pressure of the primary valve for controlling fluid flow according to the output pressure provided by the primary valve.

13. The system of claim 12, further comprising:
a pressure regulator configured to control the pressure of the fluid provided by the fluid source.

14. The system of claim 12, further comprising:
a valve positioner configured to control the position of the controlled valve according to the output pressure of the primary valve.

* * * * *